(12) United States Patent
McIntyre

(10) Patent No.: US 7,159,794 B2
(45) Date of Patent: Jan. 9, 2007

(54) PORTABLE WASH STATION

(76) Inventor: Arthur N. McIntyre, 604 Gary La., Hampton, VA (US) 23661

( * ) Notice: Subject to any disclaimer, the term of this patent is extended or adjusted under 35 U.S.C. 154(b) by 0 days.

(21) Appl. No.: 10/367,508

(22) Filed: Feb. 19, 2003

(65) Prior Publication Data

US 2004/0195346 A1   Oct. 7, 2004

(51) Int. Cl.
*A01G 25/09*   (2006.01)
(52) U.S. Cl. .................. 239/146; 239/148; 239/176; 239/303; 239/525; 239/722; 222/538; 222/608
(58) Field of Classification Search ............. 239/146, 239/148, 176, 195, 302, 303, 525, 722; 134/58 R, 134/102.2, 95.1, 98.1; 222/130, 529, 530, 222/538, 608
See application file for complete search history.

(56) References Cited

U.S. PATENT DOCUMENTS

| | | | |
|---|---|---|---|
| 5,029,758 A | 7/1991 | Chayer | |
| 6,070,808 A * | 6/2000 | Kildow | 239/146 |
| 6,206,980 B1 * | 3/2001 | Robinson | 134/21 |
| 6,279,838 B1 * | 8/2001 | Sivells et al. | 239/146 |
| 6,347,847 B1 | 2/2002 | Tiramani et al. | |

* cited by examiner

*Primary Examiner*—Steven J. Ganey
(74) *Attorney, Agent, or Firm*—Clifford N. Rosen

(57) ABSTRACT

This invention is a station for aiding in the washing of automobiles and other similar objects. The station is a wheeled cart that contains everything needed for the job. Space is provided for storage on the station of wash or rinse water; hose for connecting the station to a local water supply and for applying water to the automobile; and any article, fluid, or tool which may be of use for the task. All such space and any article therein is protected from the weather so the station may be stored outdoors. The station is of such a configuration as to minimize or eliminate the bending, stooping, and squatting usually associated with car washing. It may be constructed of molded plastic to minimize production costs.

8 Claims, 5 Drawing Sheets

US 7,159,794 B2

PORTABLE WASH STATION

BACKGROUND OF THE INVENTION

1. Field of the Invention

The present invention is in the field of aids for the washing of automobiles and other objects.

2. Description of the Prior Art

U.S. Pat. No. 5,029,758 shows a system for the washing of cars in a commercial environment such as a car sales lot or parking lot. The unit is very large and includes, among other things, various tanks, pumps and other features which are not in keeping with home use. For home use it amounts to a serious case of overkill. U.S. Pat. No. 6,347,847 B1 is related art but is not considered particularly relevant.

SUMMARY OF THE INVENTION

This invention is a novel tool for use in washing cars or other objects or articles. It consists of a station which includes space and provision for all things necessary for complete washing of cars in the home environment. Provision is made for water supply, a wash water container, washing brushes and other necessities, towels, and detergents and other solutions needed to wash, dry, treat surfaces, and wax the family car or other object. The station is on wheels so that it can be taken to the job, hooked up to the household water supply, provide all the things necessary for the washing job, then closed up and wheeled to wherever it is kept, whether outside or inside the house or garage.

While the invention is shown generally in the context of washing automobiles in a home environment, it could be used for washing virtually any object or article anywhere. It could be used, for example, to wash trailers, buses, recreational vehicles of all types, boats, aircraft, and buildings and other structures, and parts thereof such as windows.

DESCRIPTION OF THE PREFERRED EMBODIMENT

Figure 1:
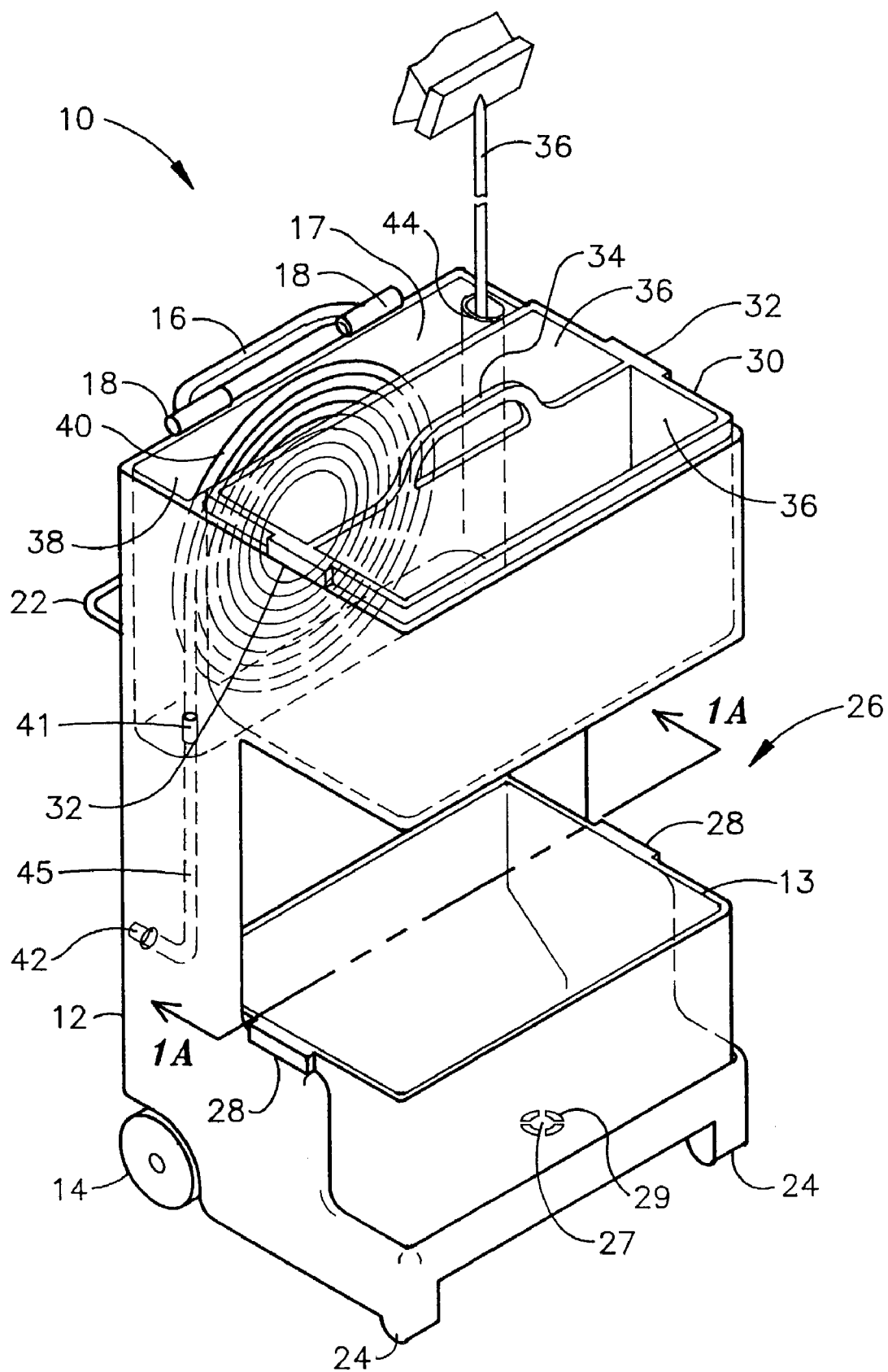
FIG. 1 is a perspective view of the preferred embodiment of the invention.
Figure 3:
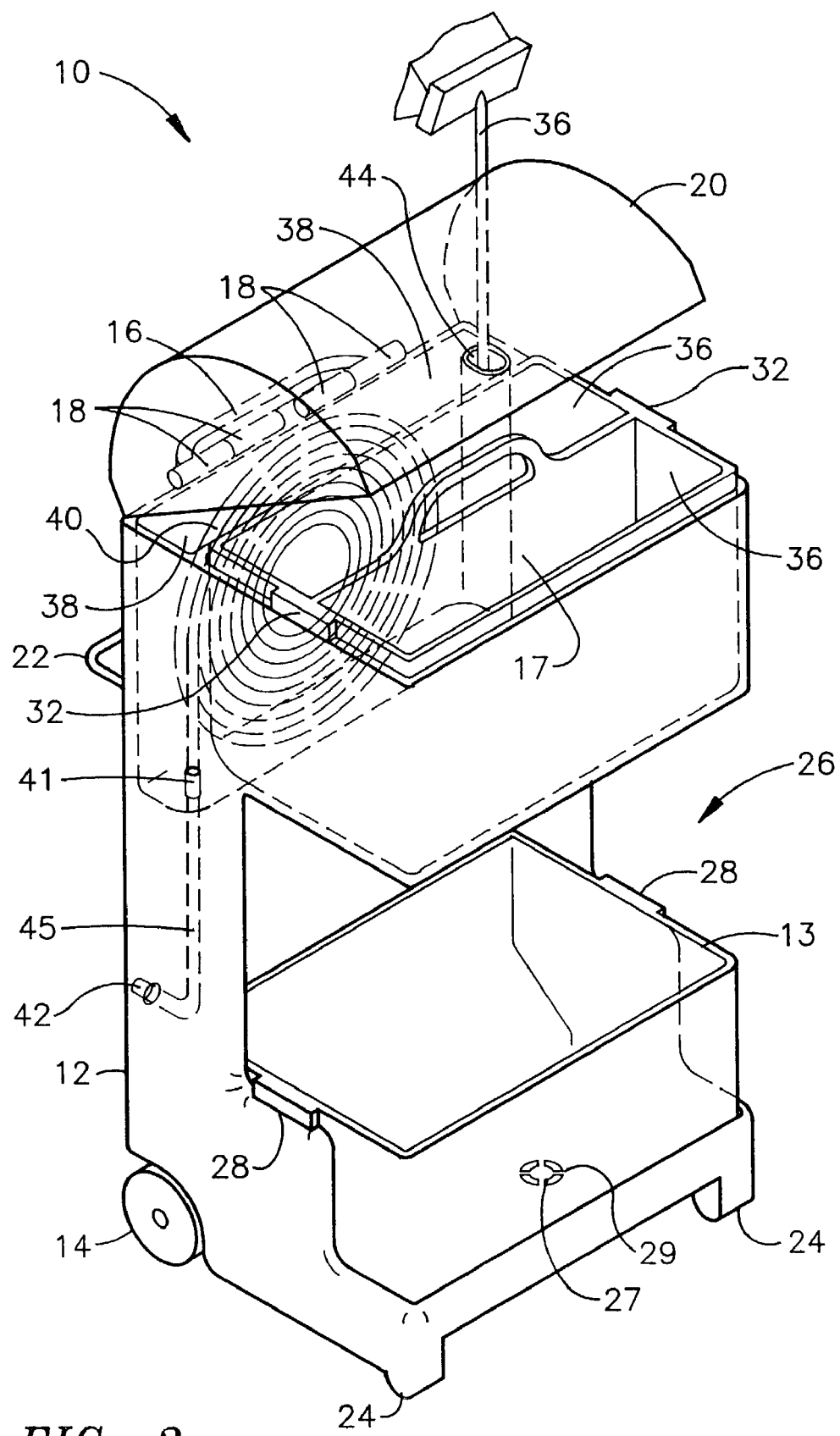
FIG. 3 is a view of the embodiment of FIG. 1 showing the detachable cover.

Referring to FIG. 1 the portable wash station 10 of the present invention consists of a body 12. The body 12 is generally cylindrical and upright. It may be made, for example, by injection molding of plastic. The portable wash station 10 has two wheels 14 at the rear and a handle 16 for pulling the station. On the upper rear edge of the body 12 near the handle 16 is a set of hinge halves 18. Referring to FIG. 3 a cover 20 has mating hinge halves 18 [in phantom] at the rear which may be snapped into the hinge halves 18 on the body to allow for removing and replacing the cover 20 at will. On the rear of the body 12 is a bar 22 which may serve as a rack for hanging towels and other objects. At the lower front of the body are legs 24 on each side. These serve to hold the station level and provide access to drain 27 [in phantom].

Figure 2:
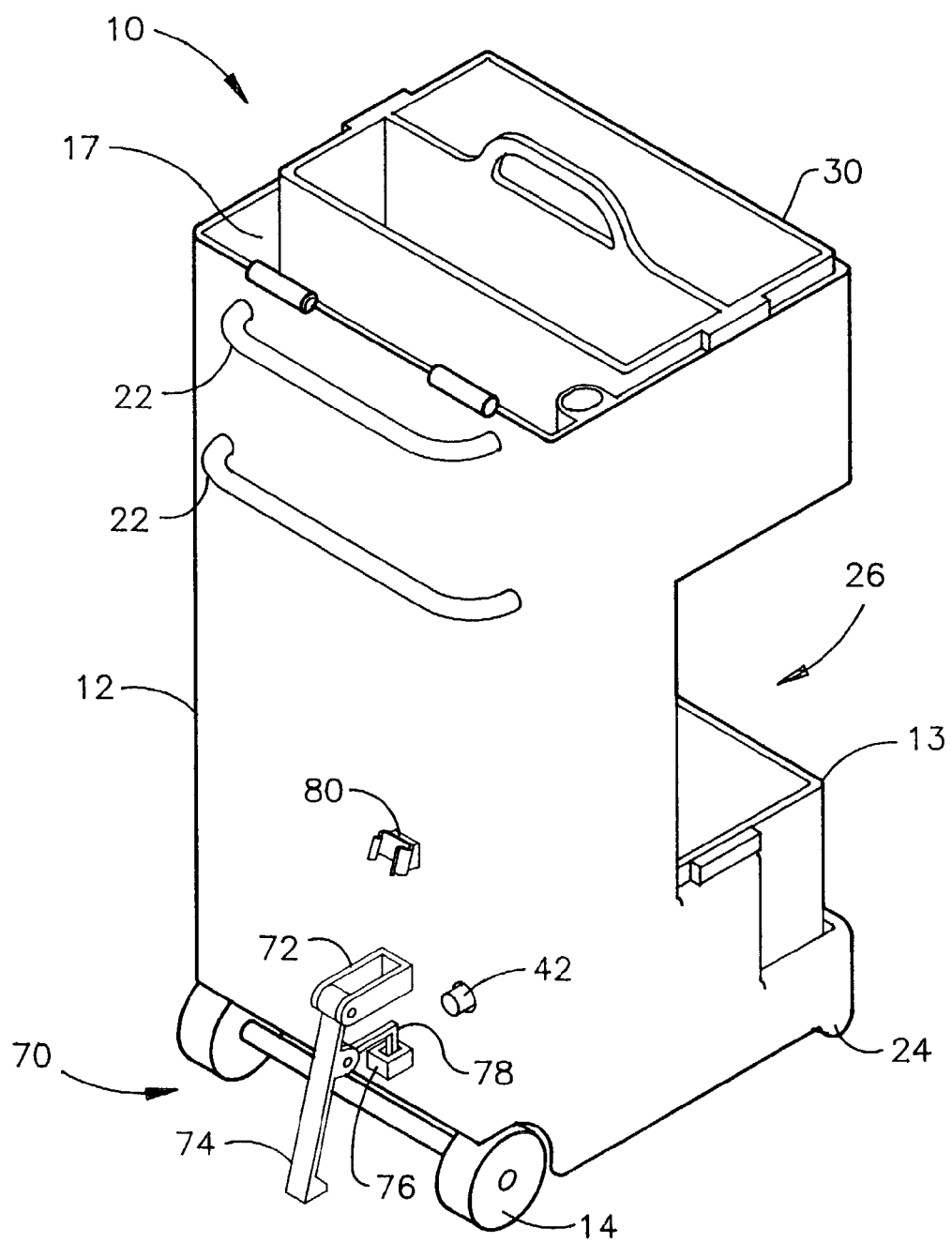
FIG. 2 is a view of the embodiment of FIG. 1 showing the tip-brace.

FIG. 2 shows tip-brace 70 which may be deployed in cases when the station might tend to tip over. The tip-brace 70 consists of base 72 attached at one end to the station body 12, tip-leg 74 attached at one end by a hinge to the base 72, an L-shaped leg support 76 attached by a hinge to the upper part of the tip-leg 74, support pocket 78 attached to the body 12, and keeper 80 attached to the body 12 at a point above the base 72. When not in use, the tip-leg 74 is stowed in the keeper 80 by a simple friction clamp. To deploy the tip-brace 70, the tip-leg 74 is pulled from the keeper 80 and rotated about its hinge until the foot of the tip-leg is in a bracing position in contact with the ground. The leg support 76 is then rotated about its hinge and the end inserted into support pocket 80. This will hold the tip-leg 74 rigidly in place and keep the station 10, which may have most of its weight on the rear, from tipping over backwards. Stowing the tip-brace 70 is the opposite of deploying it.

Figure 1A:
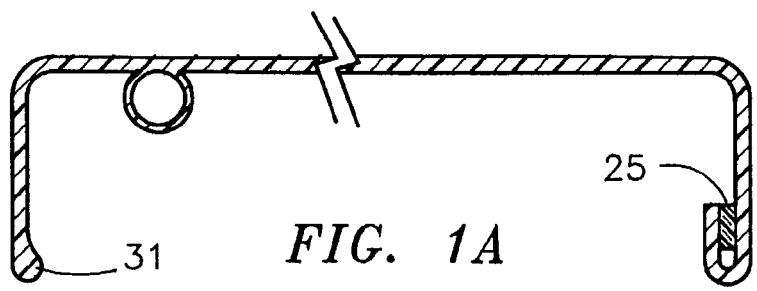
FIG. 1A is a cross section of the body of the invention showing methods of reinforcing an opening in the body.

Referring back to FIG. 1, part of the middle of the body 12 is cut away to form a lateral opening 26. The inside edges of the opening 26 would undoubtedly need reinforcing, which could be accomplished by rolling the edges of the opening between the front top and the front bottom of the opening 26. This is shown in FIG. 1A which is a cross section of the body 12 through the approximate center of the opening 26. The right side of this figure shows the edge rolled back on itself and welded by weld 25. Alternatively the edge could be bulbed in the molding process as shown at 31 on the left side of FIG. 1A.

In the opening 26 a removable tub 13 may be positioned. This tub 13 may be held in place by its handles 28. The tub 13 holds wash water along with any desired cleaning liquid or other substance. Upon completion of the wash job the tub 13 may be lifted from its position in opening 26 and the wash water disposed of. Alternatively the wash water may be drained from tub 13 by means of the drain 27 in its bottom. The drain 27 is accessed and discharged through an opening 29 [in phantom] in the body 12 under the tub 13.

In the top of the body 12 is an upper lateral opening 17 in which a caddy 30 may be positioned held in place by handles 32. The caddy 30 may be used for storing detergent, wash cloths, towels, wax or any other thing used in the task of washing and detailing cars. The caddy 30 is easily removable from the body 12 either by handles 32 or center handle 34. The caddy may be divided into one or more compartments 36 for convenience. The cover 20 protects the contents of the caddy from the weather at all times when it is closed.

Behind the caddy 30 is a compartment 38. This compartment is adapted to hold a spray hose 40. In the compartment 38 is a hose fitting 41 which may be of the quick-connect type, or may be an ordinary hose fitting. The hose fitting 41 is on the end of a tube 45 which may be molded into the body 12 and which extends to a relatively low position on the body 12. This tube bends and exits the body 12 through another hose fitting 42. A hose [not shown] from the local water supply may be fastened in the usual fashion to the outside end of the hose fitting 42 which again may be of the quick-connect or ordinary type. Locating the hose fitting 42 low on the body 12 helps to prevent tipping of the station 10 in the event excess tension is put on the local water supply hose. Spray hose 40 is attached to the hose fitting 41 and when extended from its place in the compartment 38 serves to provide rinse water for any part of the washing operation.

The spray hose 40 may be of the lightweight, collapsible type to save space and weight on the station 10.

Mounted on the station body 12 anywhere—for example on one end of the compartment 38—is a fixture in the form of a tube 44. The tube 44 provides storage means for any appliance with a long handle, such as a scrub brush 36. The storage tube 44 may be configured so that the cover 20 can be closed while a brush is in the storage tube. While only one storage tube 44 is shown in the figures it would be possible to provide two or more.

One feature of station 10 as shown in FIG. 1 is that it is relatively free of protuberances on its exterior. This makes the station 10 much more convenient for moving around in a storage area—a garage, for example—without hindrance from catching on other objects.

Figure 4:
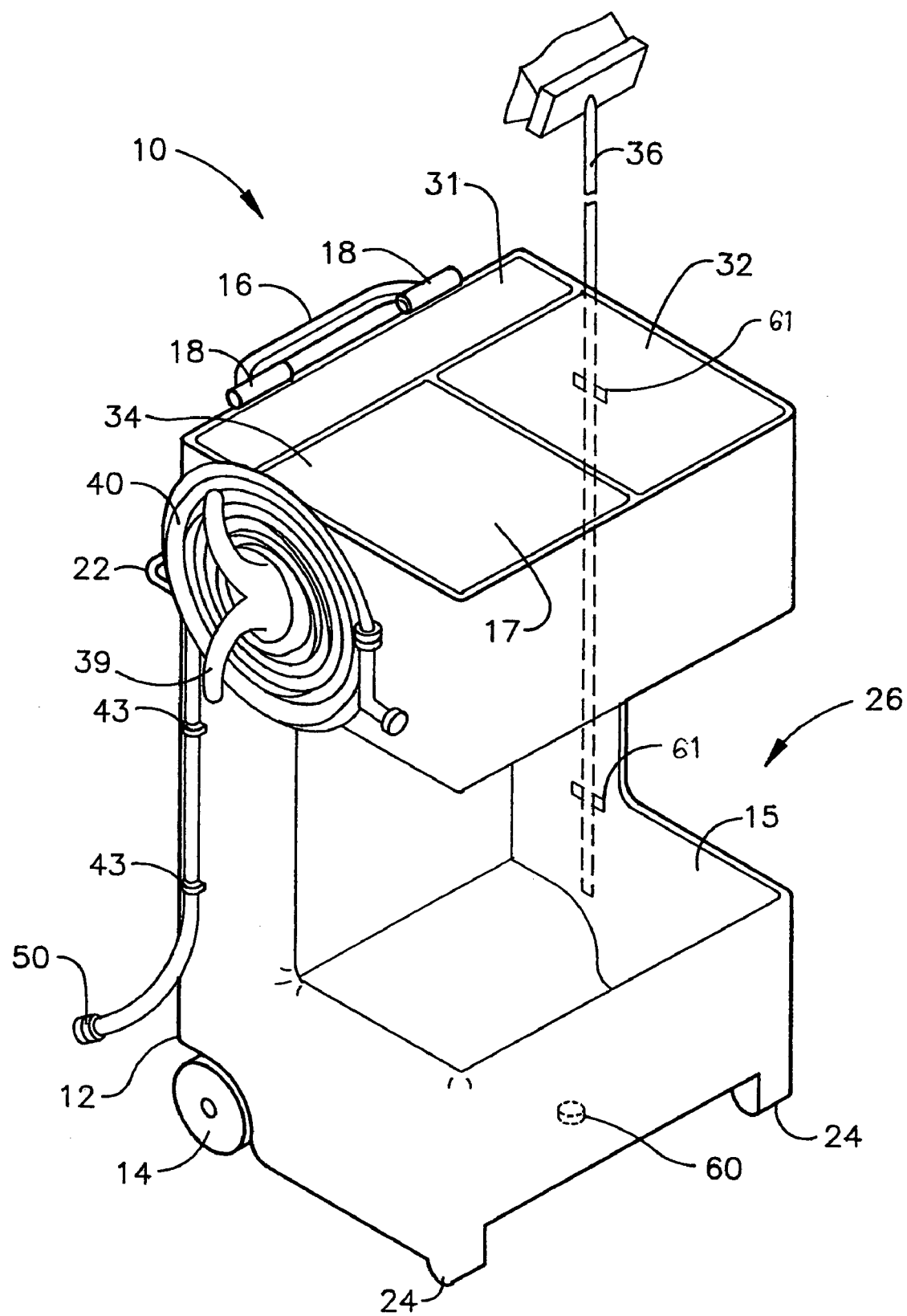
FIG. 4 is a perspective view of a second embodiment of the invention.

Another embodiment of car wash station 10 is shown in FIG. 4. This embodiment is similar to the embodiment of FIG. 1 but instead of having a removable wash water tub 13 and caddy 30, these features are built into the body. A wash water tub 15 is located at the same place in opening 26 in the body 12 as was the removable tub 13 in FIG. 1. In this case however the tub 15 may have a drain 60 in its side or bottom [shown in phantom] for disposing of used wash water. As was the case with the embodiment of FIG. 1 the drain 60 is accessed by virtue of space provided under body 12 by the legs 24. In the upper lateral opening 17 of the body 12 are located storage compartments 31, 32, and 34 for storing detergents, brushes, rags, sponges, etc. Three compartments are shown but any number may be provided. The compartments may be molded in, or provision may be made to adjust the arrangement of the compartments to suit the operator. When the cover 20 is closed the compartments and their contents are protected from the weather. Provision is made at the side of the body 12 for storage of long-handled appliances, such as the brush 36. This may be effected by any means known in the art such as fixtures in the form of the clamps 61 shown in phantom.

Bracket 39 and clamps 43 are shown on the side of the body 12. Spray hose 40 may be stored on the side of the body by means of the bracket 39 and clamps 43. Preferably the spray hose 40 has a coupling 50 for removable attachment to the local water supply. As in the embodiment of FIG. 1 the spray hose 40 may be of the lightweight, collapsible type to save space and weight.

The advantage of the embodiment of FIG. 4 lies in manufacturing. Presumably the station could be molded in two pieces—the body 12 and the cover 20—rather than four as with the embodiment of FIG. 1. This would lower manufacturing costs appreciably.

Figure 5:
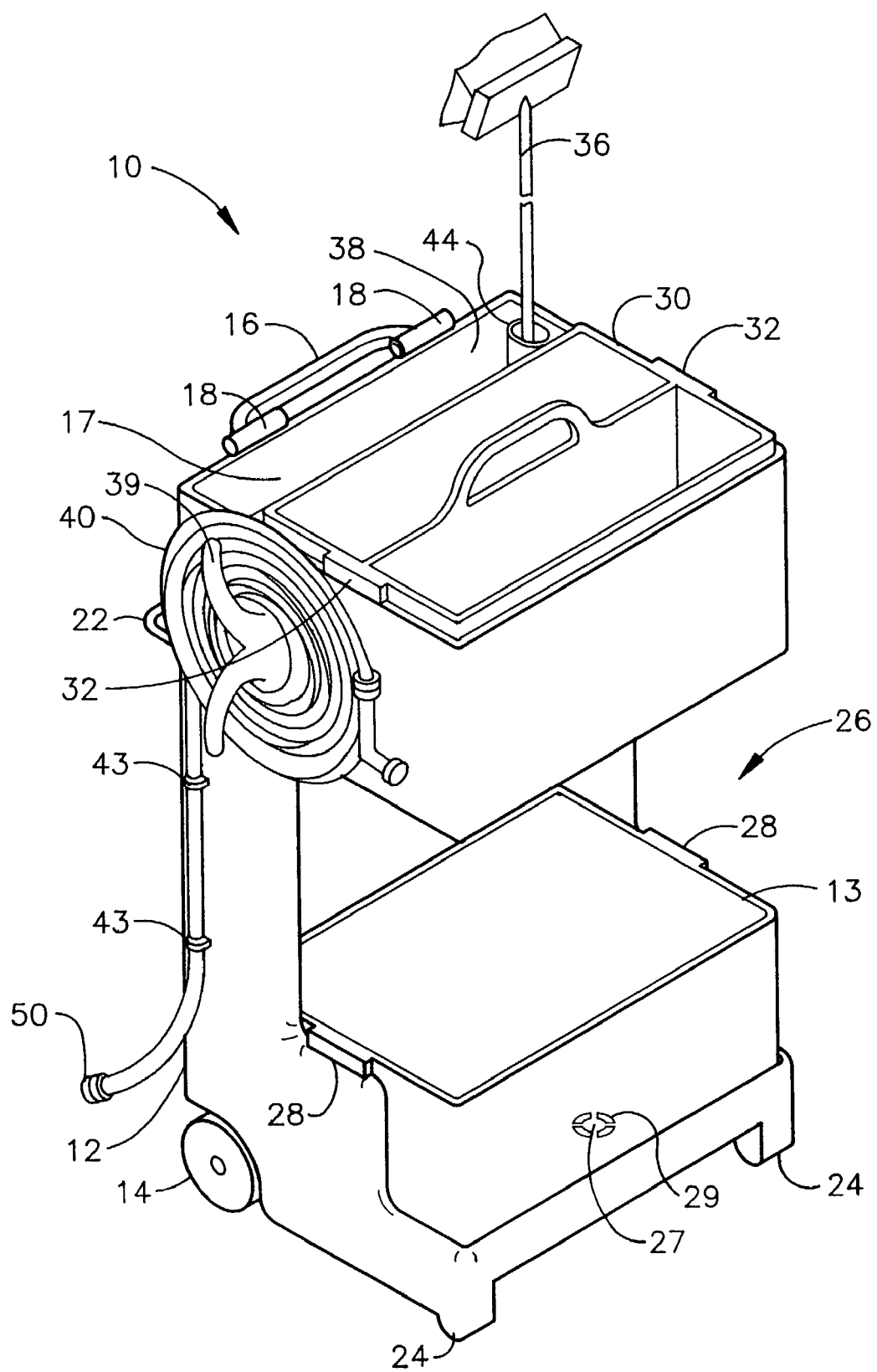
FIG. 5 is a perspective view of a third embodiment of the invention.

Still another variation of the invention is shown in FIG. 5. In this case the wash water tub 13 and the caddy 30 are separate and removable but the spray hose 40 and the wash brush 36 are mounted to the exterior of body 12 by the same means as shown in FIG. 4. This feature provides the potential user with the alternative of having a station with more interior space for storage and for wash water.

The chief advantage of this invention is that it puts all the implements and facilities for washing a car or other similar object at the operator's fingertips. Everything needed for the operation is contained in the station. The station itself is readily movable and storable. It may be stored outdoors and still protect its components and contents from the weather. By keeping implements within easy reach the device saves the user a good deal of bending, squatting, and lifting. It is expected that the cost of manufacturing the station will put it within easy reach of the average household, where it will prove a boon for what heretofore has often been a disagreeable task.

While the invention is shown and described in particular arrangements, it should be obvious that other arrangements of the parts could be used. For example, the compartment for the spray hose 40 could be located in the front of the body 12. Or the wash water tub could be arranged so it is accessible from the rear of the body rather than the front.

I claim:

1. A portable wash station for use in washing objects or articles comprising:

and an upright body having wheels at the bottom and a handle for pulling the station, further comprising:
a lateral opening in a lower part of the body for containing wash water;
a tub for wash water mounted removably in the lateral opening in the lower part of the body;
a lateral opening in an upper part of the body;
compartments in the upper part of the body for storage of hose and other objects,
the compartments in the upper part of the body comprising a caddy which is mounted removably in the upper lateral opening, the caddy having handles by which it is mounted in the opening and by which it may be readily removed;
a cover covering the compartments;
a tip-brace mounted on the exterior of the body;
fixtures on the body for storage of long-handled objects;
fittings on the body for connecting the station to a water supply,
a matching set of hinge halves mounted on one edge of the cover, such that when the hinge halves are secured together into a single hinge, the cover is easily removed, replaced, or lifted and lowered by the hinge,
legs on the bottom thereof for supporting the wash station in an upright position with the body spaced from the ground,
the upper storage compartments including a separate compartment for storing a spray hose, the compartment including a first fitting mounted in one wall to which the spray hose may be connected, the first fitting being connected to a tube running to the lower part of the body and passing therethrough by a second fitting for connection on the outside of a water supply hose,
the back of the body including a rack mounted thereon for hanging towels or other objects,
and the spray hose being of the lightweight, collapsible type.

2. The portable wash station of claim 1 further characterized in that the fixtures on the body for storage of long-handled objects are mounted on the side of the body.

3. The portable wash station of claim 1 wherein the fixtures for storing of long-handled objects comprises a tube fastened to or integral with the body.

4. The portable wash station of claim 1 further characterized in that the tip-brace consists of a tip-leg adapted to be deployed from a stowed, inoperative position to an operative position in which the tip-leg is in a braced, rigid position in contact with the ground; and that the edges of the lateral opening in the lower part of the body are bulbed or rolled for reinforcement.

5. The portable wash station of claim 1 further characterized in that a side of the body includes clamps and a bracket mounted thereto for storing thereon a spray hose, and the fixtures for storage of long-handled objects are in the form of clamps.

6. A portable wash station for use in washing objects or articles comprising an upright body having wheels at the bottom and a handle for pulling the station, further comprising: a lateral opening in a lower part of the body for containing wash water, the lower lateral opening comprising a wash water tub which is an integral part of the body, the tub including a drain for draining the wash water, a lateral opening in an upper part of the body, compartments in the upper part of the body for storage of hose and other objects, the upper storage compartments being an integral part of the body and including a separate compartment for storing a spray hose, the compartment including a first fitting mounted in one wall to which the spray hose may be connected, the first fitting being connected to a tube running to the lower part of the body and passing therethrough by a second fitting for connection on the outside of a water supply hose, a cover covering the compartments, a matching set of hinge valves mounted on one edge of the cover such that when the hinge halves are secured together into a single hinge, the cover is easily removed, replaced, or lifted and lowered by the hinge, a tip-brace mounted on the exterior of the body, fixtures on the body for storage of long-handled objects, fittings on the body for connecting the station to a water supply, legs on the bottom thereof for supporting the wash station in an upright position with the body spaced from the ground, the back of the body including a rack mounted thereon for hanging towels or other objects.

7. The portable wash station of claim 6 further characterized in that a side of the body includes clamps and a bracket mounted thereto for storing thereon a spray hose, and the fixtures for storage of long-handled objects are in the form of clamps.

8. The portable wash station of claim 7 further characterized in that the spray hose is of the lightweight, collapsible type.

* * * * *